(12) United States Patent
Brant et al.

(10) Patent No.: US 6,763,398 B2
(45) Date of Patent: Jul. 13, 2004

(54) MODULAR RAID CONTROLLER

(75) Inventors: William A. Brant, Boulder, CO (US); Randall F. Horning, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 09/941,469

(22) Filed: Aug. 29, 2001

(65) Prior Publication Data

US 2003/0051098 A1 Mar. 13, 2003

(51) Int. Cl.[7] .................................................. G06F 3/00
(52) U.S. Cl. ............................ 710/8; 710/74; 710/101; 710/129; 711/114
(58) Field of Search ............................. 710/8, 10, 33, 710/36, 62, 74, 100, 101, 102, 105, 129, 14; 711/100, 114, 269, 770, 48

(56) References Cited

U.S. PATENT DOCUMENTS

| | | | | |
|---|---|---|---|---|
| 5,477,552 A | * | 12/1995 | Nishiyama | 371/40.1 |
| 5,628,637 A | | 5/1997 | Pecone et al. | 439/74 |
| 6,023,780 A | * | 2/2000 | Iwatani | 714/770 |
| 6,076,142 A | | 6/2000 | Corrington et al. | 711/114 |
| 6,098,140 A | | 8/2000 | Pecone et al. | 710/129 |
| 6,188,571 B1 | | 2/2001 | Roganti et al. | 361/685 |
| 6,192,027 B1 | * | 2/2001 | El-Batal | 370/222 |
| 6,223,250 B1 | | 4/2001 | Yokono | 711/114 |
| 6,295,565 B1 | * | 9/2001 | Lee | 710/102 |
| 6,434,720 B1 | * | 8/2002 | Meyer | 714/820 |
| 6,549,978 B2 | * | 4/2003 | Mansur et al. | 711/114 |

FOREIGN PATENT DOCUMENTS

| WO | WO9711426 | 3/1997 | .......... G06F/13/00 |
|---|---|---|---|
| WO | WO0122221 | 3/2001 | .......... G06F/9/455 |

* cited by examiner

*Primary Examiner*—Rehana Perveen
*Assistant Examiner*—Rijue Mai
(74) *Attorney, Agent, or Firm*—Arthur J. Samodovitz

(57) ABSTRACT

A storage controller for redundant arrays of independent disks (RAID) comprises a daughter card containing a standardized controller core, which is mated to one of a number of customizable controller interface cards. The controller core card includes high performance elements such as a processor, cache memory, CRC circuitry, a host port, and a storage port. All operational communication with non-core components occurs via the host port and the storage port through the controller interface card. The controller core card monitors and configures communications between the host and the storage array. Each controller interface card is populated with components and connectors particular to the respective application or RAID system. The size and layout of the controller interface card may also be customized to the particular application. Sharing the same controller core card among various RAID controllers lowers the cost and time-to-market for customized RAID systems.

18 Claims, 9 Drawing Sheets

MODULAR RAID CONTROLLER

BACKGROUND OF THE INVENTION

1. The Field of the Invention

The present invention relates to the field of storage controllers and more particularly to storage controllers for redundant disk arrays.

2. The Relevant Art

Modern computer networks and systems require reliable means for the storage of data. For example, the wide-spread usage of online databases for conducting transactions and data retrieval has increased the demand for large data stores with non-stop, low-latency access. Various systems using redundant arrays of independent disk drives (RAID) have been developed and deployed in response to this need.

Customer requirements for RAID systems are highly application dependent. RAID systems vary in their interconnection architectures, physical packaging and dimensions, redundancy methods, fail-safe mechanisms, and the like. The disk drives available for use within RAID systems are also vary in their physical specifications, storage capacities, performance capabilities, and electrical interface. Due to the non-standardization in the aforementioned areas, a great deal of flexibility is required of RAID controllers.

As with many computing devices, much of the flexibility required of RAID controllers is achieved using configuration options stored in some type of non-volatile memory. The control software reads the configuration options, makes appropriate adjustments within peripheral devices and components, and changes its program flow to accomplish the desired behavior. As a consequence, much of the development cost of a RAID controller lies in the development of the control processor and associated firmware.

Another costly area of development is the architecting, characterizing and testing of the high bandwidth data paths that largely determine the performance of a RAID controller. The key performance metrics of access latency, throughput and reliability are directly affected by the design of these data paths. Due to these and other issues, the cost of re-architecting and redesigning a RAID controller for each possible system is prohibitive.

In contrast to the advanced features, high performance and flexibility required of RAID controllers, another key requirement is low cost. Many RAID systems use redundant controllers to increase reliability. The cost of the RAID controller may have a significant impact on the overall system cost. Entry level RAID systems are particularly price sensitive and must maintain a low cost per gigabyte of storage even with relatively small arrays of storage devices. Reducing the cost of key components, for example by making volume purchases without accumulating unneeded inventory, is crucial to lowering the cost of a RAID controller.

Another factor contributing to the cost of RAID systems is the opportunity cost associated with time-to-market. The inability to meet rising demand of a new product or market segment may significantly reduce or entirely eliminate prospective profits. Being the first to market with the right combination of features, price and performance is crucial for market success and the long term prospects of manufacturers of RAID systems.

What is needed is a mechanism to develop and customize a RAID controller quickly and at a low cost. Such a mechanism should facilitate cost effective procurement practices, reduce the time to market for new products, and leverage the high development and component cost of the core elements of a RAID controller.

OBJECTS AND BRIEF SUMMARY OF THE INVENTION

The apparatus of the present invention has been developed in response to the present state of the art, and in particular, in response to the problems and needs in the art that have not yet been fully solved by currently available RAID controllers. Accordingly, it is an overall object of the present invention to provide an improved method and apparatus for customizing and deploying a RAID controller that overcomes many or all of the above-discussed shortcomings in the art.

To achieve the foregoing object, and in accordance with the invention as embodied and broadly described herein in the preferred embodiments, an apparatus and method for customizing and deploying a modular RAID controller is provided wherein the functionality and components of a RAID controller are partitioned into a controller core card and a controller interface card.

The controller interface card contains those components and features that are generally unique to a particular customer or product such as I/O connectors, power control including battery backup, status indicators, hot swap features, configuration options and the like. The controller interface card is designed to match the physical constraints and form factor of a particular product or manufacturer. Design and development of these features are typically low-cost, straightforward and well known in the art. Generally, these features may be developed and produced as needed without significantly impacting delivery schedules and production costs.

The controller core card contains those components associated with costly development and production such as control processor, storage cache, XOR function, and channel controllers. These are also typically the components that are most easily standardized over a broad variety of systems and applications. Overall product cost is minimized by designing, developing, manufacturing and stocking a single common controller core card that is standardized across many RAID systems and their various form factors and value added features. Inventory costs are minimized and forecasting errors offset by using the same controller core card for multiple customers or product lines.

In one embodiment, the controller core card is a daughter card that mates with the controller interface card via a storage connector and a host connector. The storage connector and the host connector provide physical and electrical connectivity between the controller core card and the controller interface card.

In the preferred embodiment, the signals carried by storage and host connectors are selected to minimize the complexity of interfacing the controller core card with the controller interface card. The storage connector carries those signals generally associated with storage devices and arrays including power control signals, whereas the host connector carries those signals generally associated with the host such as system status signals. The storage connector and the host connector also carry the data being transmitted to and from the storage disks, preferably using a fibre channel interface.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
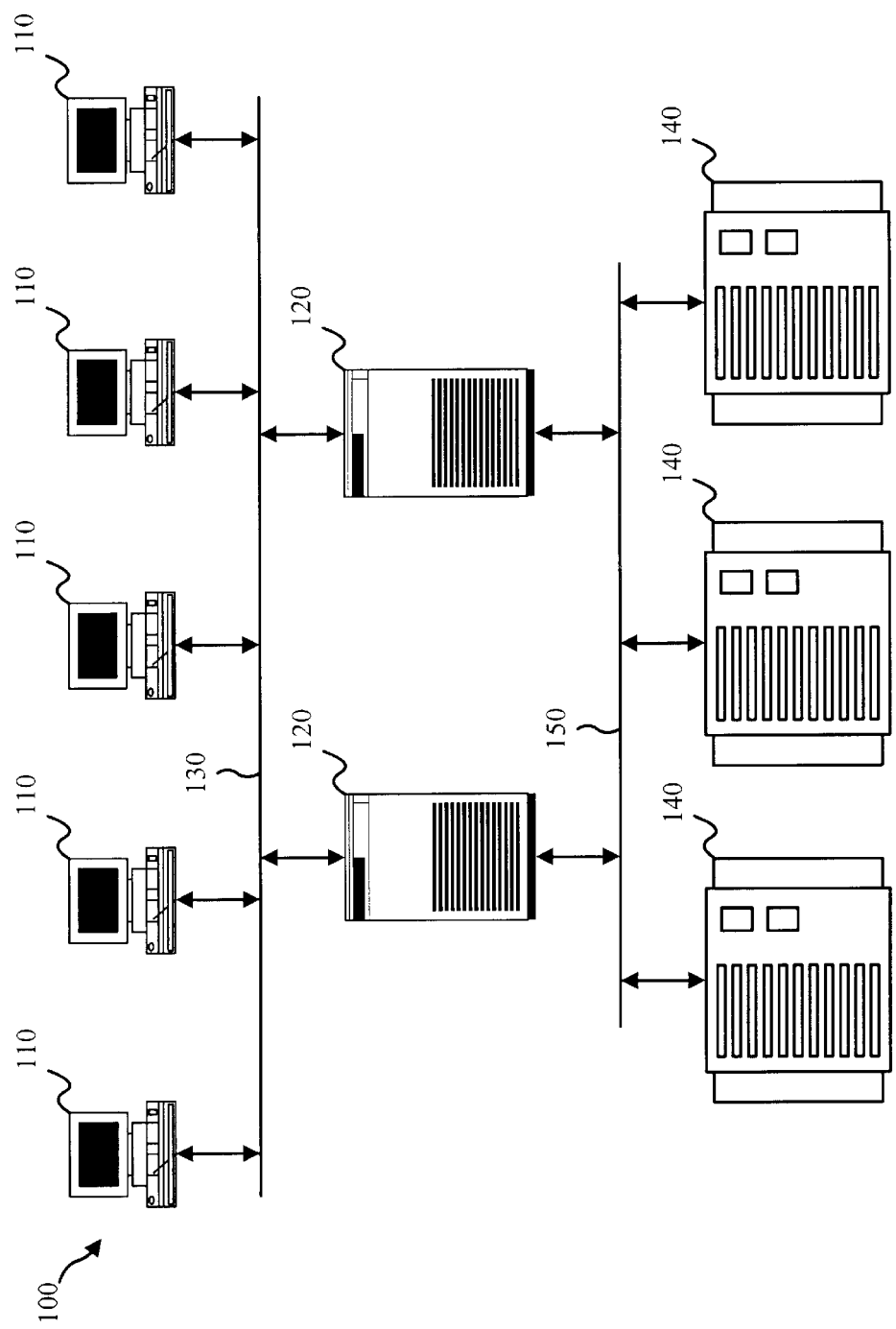
FIG. 1 is a schematic block diagram illustrating a representative RAID network in accordance with the present invention.

FIG. 1 shows a representative RAID network 100 suitable for use with the present invention. The RAID network 100 as shown includes a number of workstations 110 and servers 120 interconnected by a local area network 130. The servers 120 may be configured to provide specific services such as print services, storage services, Internet access, and the like.

In the depicted embodiment, the servers 120 provide storage services to the local area network 130 via one or more storage arrays 140. The servers 120 are interconnected with the storage arrays 140 through a storage network 150. In one embodiment, the storage network 150 is a local area network in which the servers 120 and the storage arrays 140 are housed within the same facility or campus. In another embodiment, the storage network 150 is a wide area network with the servers 120 and the storage arrays 140 housed in geographically disparate locations.

Figure 2:
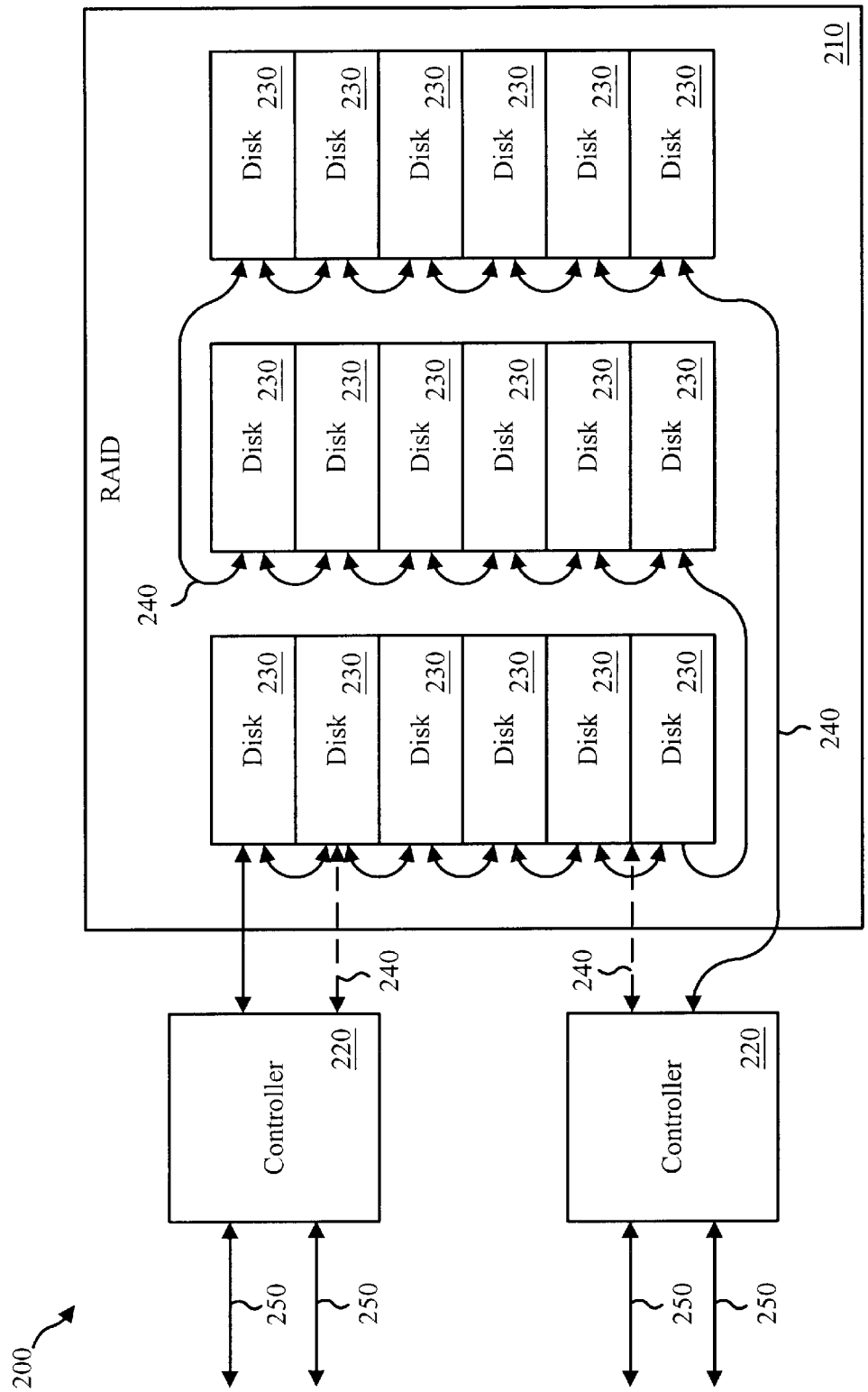
FIG. 2 is a schematic block diagram illustrating one embodiment of a RAID system in accordance with the present invention.

FIG. 2 shows one example of a RAID system 200 illustrating the need for the present invention. The RAID system 200 includes a storage array 210 and one or more RAID controllers 220. The RAID system 200 preferably includes a plurality of RAID controllers 220 in order to achieve increased reliability through redundancy. The storage array 210 is also preferably redundant by including a number of storage devices 230. The storage devices 230 are interconnected with an array loop 240. The array loop 240 also interconnects the RAID controllers 220 with the storage array 210. In the depicted embodiment, the array loop 240 is a point-to-point loop such as that defined by the fibre channel standard.

In one embodiment, the fibre channel drives are dual ported devices. Thus, both controllers are connected to all of the disk drives and are configured to conduct back-end communications on the same buses on which data transfer occurs. At the host side, a switch device is used to connect the controllers to the hosts. Thus, in this embodiment, a controller to controller connection on the host side is unnecessary, as all communications occur on the storage side where the captive (non shared) bus for the storage system resides. The multi-point connections are preferably present on the host side and are used primarily for fault redundancy.)

In the depicted embodiment, the RAID controllers 220 each support a host connection 250. The RAID controllers 220 receive access requests via the host connection 250 and service those requests by transferring blocks of data to and from the storage array. The blocks of data that are transferred to the storage array are redundantly encoded to permit error detection and data recovery in the event of a failure of a one of the storage devices 230.

In addition to data redundancy, the RAID controllers 220 preferably support some type of failover mechanism. In one embodiment, for example, one of the RAID controllers 220 is a primary controller while the remaining RAID controllers 220 are standby controllers that monitor the activity of the primary controller. One of the standby controllers is activated in the event of a failure of the primary controller. A host loop 260 facilitates the standby controllers servicing access requests in the event of a primary controller failure. In another embodiment, the RAID controllers 220 support load sharing. If a failure occurs in one of the RAID controllers 220, the remaining RAID controllers 220 pick up additional traffic load via the host loop 260.

In the preferred embodiment, the RAID controllers 220 support data caching via an onboard storage cache. Onboard storage cache improves the performance of the RAID system 200. In the event of a power failure, unwritten data is flushed from the storage cache to the storage array 210 while the RAID controller 220 operates on backup power.

Many different packaging options exist for the RAID controllers 220. In one embodiment, the RAID controllers 220 are housed in the same chassis as the storage array 210. In another embodiment, the RAID controllers 220 are contained within the servers 120 shown in FIG. 1. The form factor of the chassis within which the RAID controllers 220 are housed, and the electrical interface used therein is often manufacturer or product dependent.

Various options also exist for providing backup power. In one embodiment, the RAID controllers 220 support an onboard battery backup unit. In another embodiment they interface to a standalone backup power unit. The RAID controllers 220 may include status indicators of various types including controller availability, storage cache status, host connection status, array loop status, and the like. Due to the aforementioned options as well as unanticipated options, and different physical and connectivity constraints, it is preferable that the RAID controller 220 be easily customizable in order to support the desired options and differing parameters at a reasonable cost.

Figure 3:
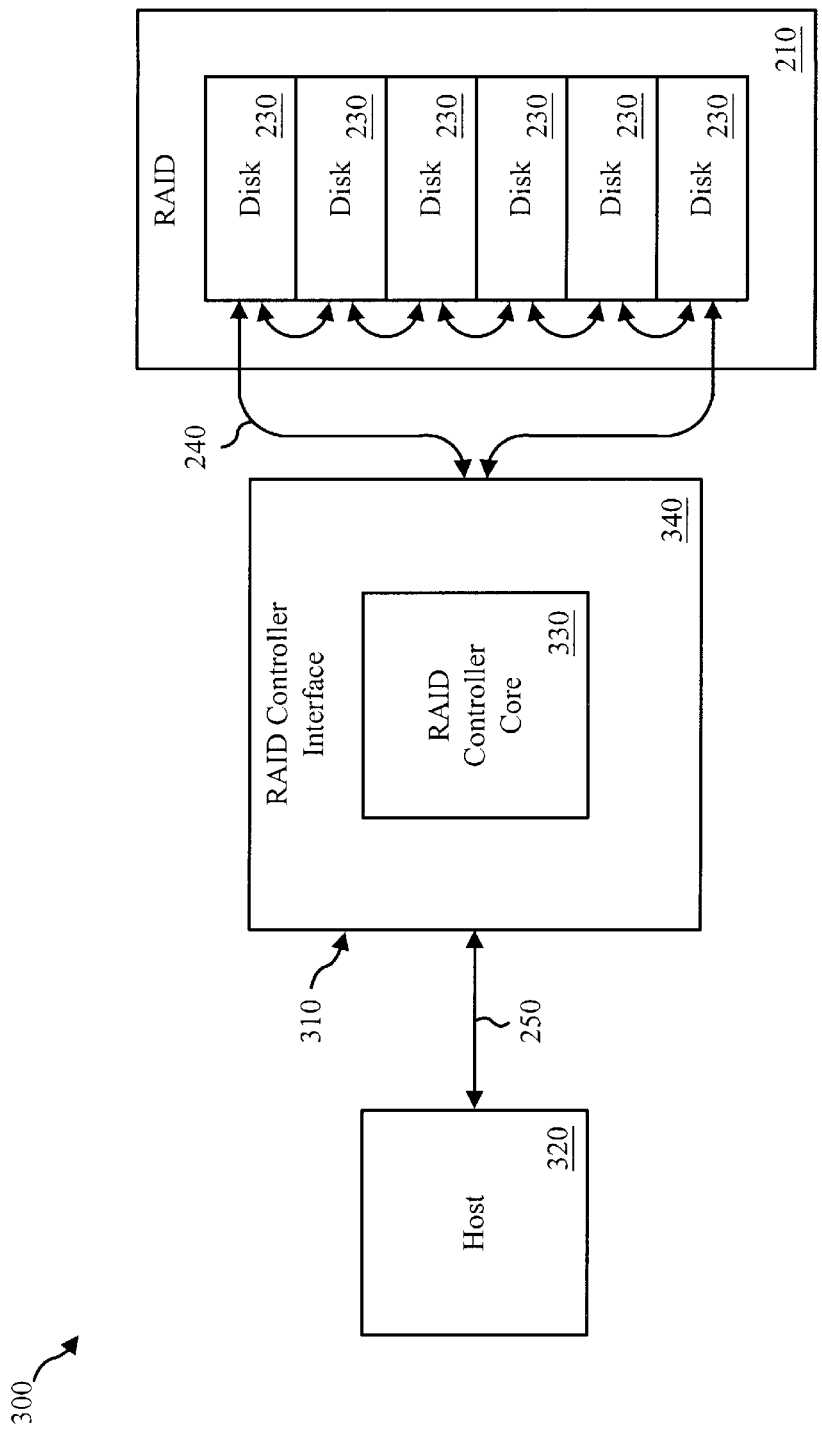
FIG. 3 is a schematic block diagram illustrating one embodiment of a RAID system with a modular controller in accordance with the present invention.

FIG. 3 is a schematic block diagram illustrating one embodiment of a RAID system 300 that includes a modular RAID controller 310 that addresses the need for quick, low-cost customization. The RAID system 300 also includes a host 320 and the storage array 210. The storage array 210 contains the storage devices 230 interconnected by the array loop 240 of FIG. 2. The modular RAID controller 310 receives access requests from the host 320 via the host connection 250.

The modular RAID controller 310 is, under the present invention, partitioned into the RAID controller core 330 and the RAID controller interface 340. The RAID controller core 330 contains functions that are essential to a RAID controller and which are most readily subject to standardization. The RAID controller interface 340 contains elements that tend to vary between various RAID controller designs such as I/O connectors, power control including battery backup, status indicators, hot swap features, physical dimensions, and the like. Modularization of the modular RAID controller 310 allows customization to exclusively effect the RAID controller interface 340 without requiring modification to the RAID controller core 330.

Figure 4:
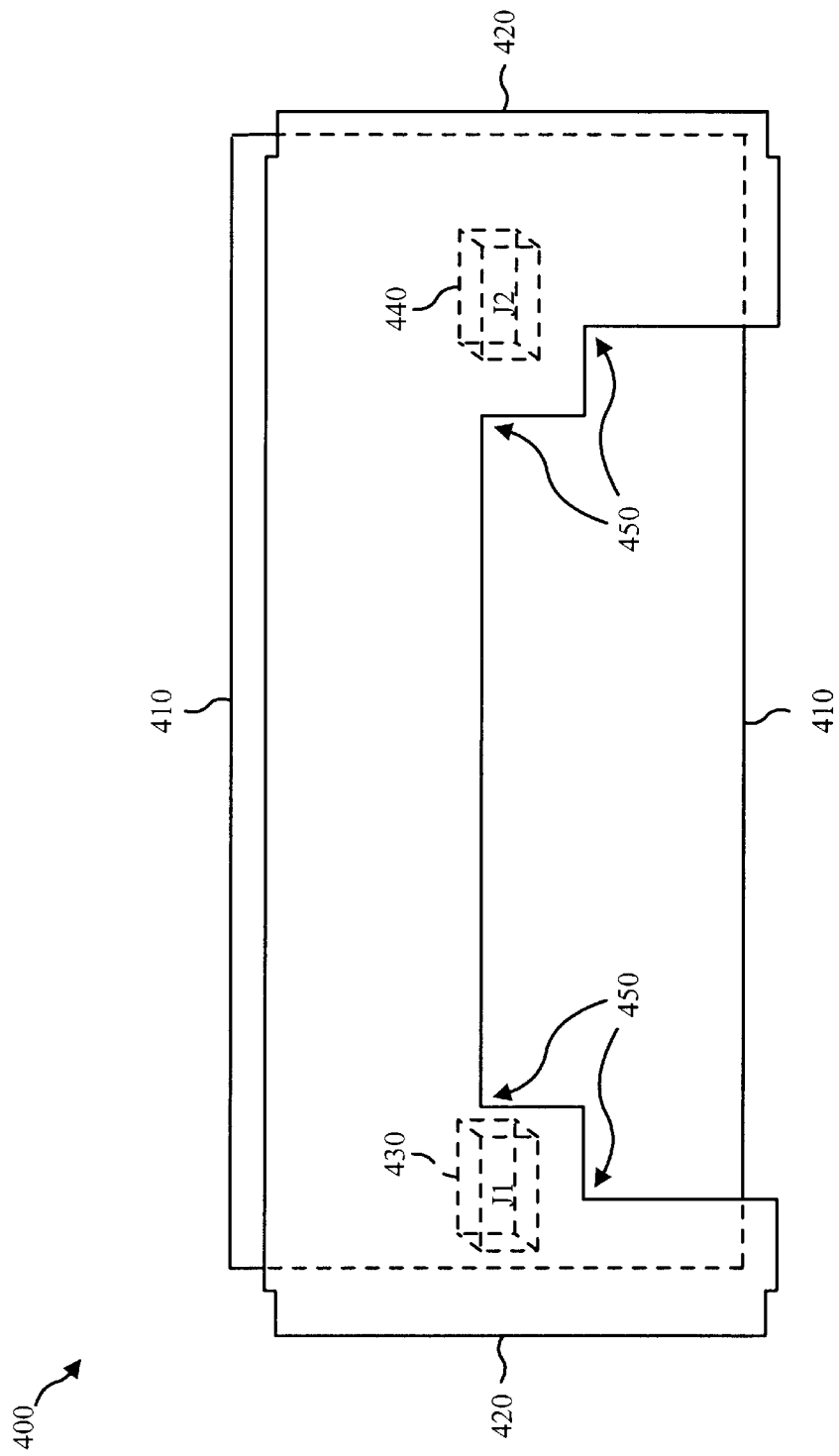
FIG. 4 is a phantomed top view illustrating one embodiment of a RAID controller card set of the present invention.

FIG. 4 is a phantomed top view depicting one embodiment of a RAID controller card set 400 of the present invention. FIG. 4 illustrates the physical outline of a controller core card 410 and a controller interface card 420. The controller core card 410 preferably corresponds to the RAID controller core 330 while the controller interface card 420 preferably corresponds to the RAID controller interface 340. The combination of the two cards 410, 420 in the RAID controller card set 400 may, under the present invention, be used to implement the modular RAID controller 310 of FIG. 3.

The controller interface card 420 contains those components that are generally unique to a particular customer or product such as I/O connectors, power control including battery backup, status indicators, hot swap features and the like. The controller interface card 420 also matches the physical constraints, form factor and electrical interface of the particular application.

The controller core card 410 contains those components associated with costly development and production such as control processor, storage cache and channel controllers. Overall product cost is minimized by standardizing the controller core card 410 across various different RAID systems and their various form factors, and value added features and options. Inventory costs are minimized and forecasting errors offset by using the modular RAID controller card set 400 for multiple customers and product lines.

In the depicted embodiment, the controller core card 410 is a daughter card and may mount exclusively upon the controller interface card 420. Preferably, the controller interface card 420 is connected and mates with a plurality of connectors associated with communication ports. In the depicted embodiment these include a host port connector 430 and a storage port connector 440. The host port connector 430 and the storage port connector 440 provide physical and electrical connectivity between the controller core card 410 and the controller interface card 420. Preferably, all communications to and from the controller core card 410 are relayed through the controller interface card 420. The controller interface card 420 is shown with a cutout 450 that provides physical access to removable components such as a memory module of the controller core card 410. While the controller interface card 420 is shown with a particular design, the depicted shape is given only by way of example. It should be readily apparent that the controller interface card 420 may be customized in shape and overall dimensions to each particular application.

Figure 5:
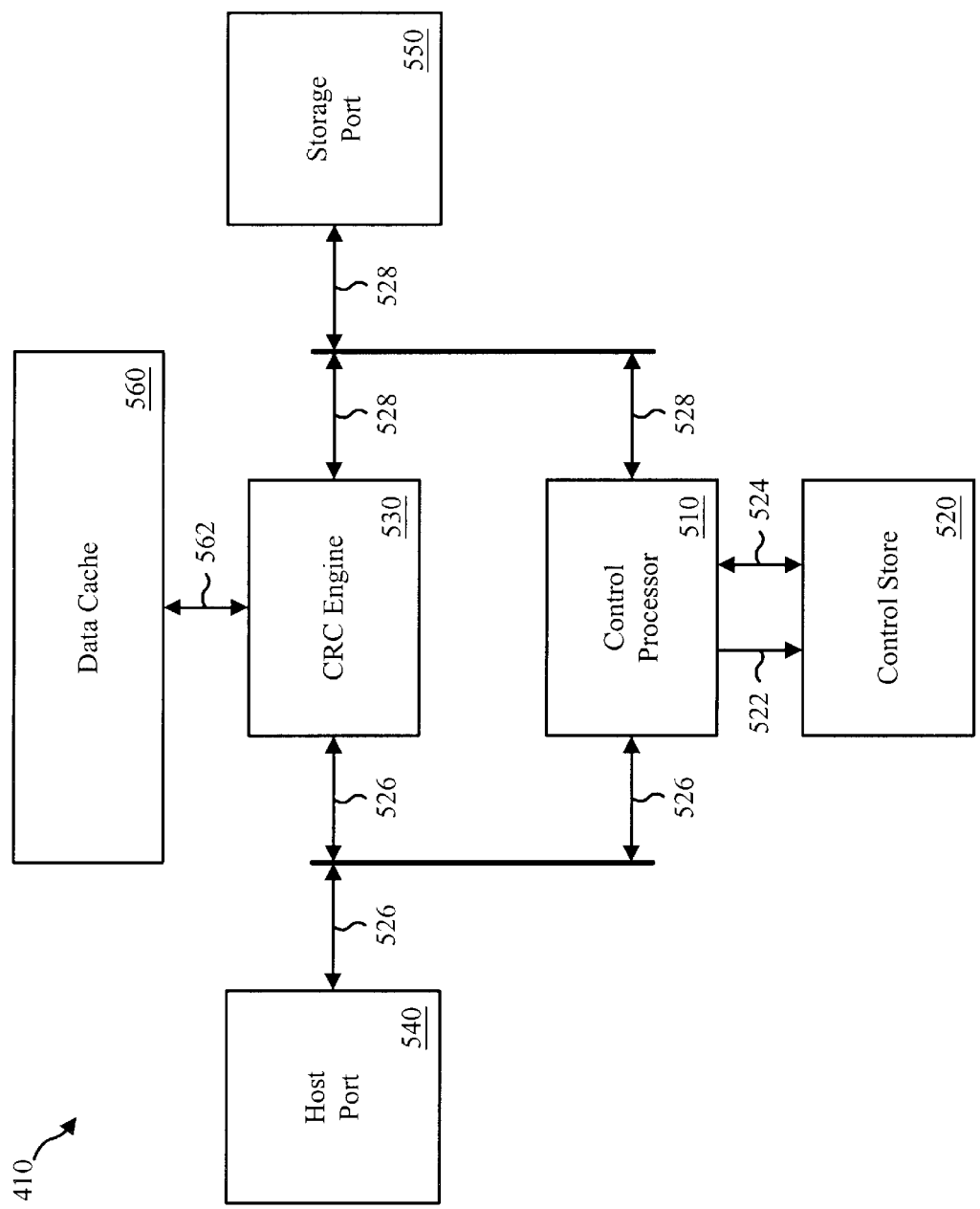
FIG. 5 is a schematic block diagram illustrating one embodiment of a controller core card of the present invention.

FIG. 5 is a schematic block diagram illustrating more particularly one embodiment of the controller core card 410 of FIG. 4. The controller core card 410 is preferably configured to support fault-tolerant systems with data redundancy, active standby and load sharing capabilities. Within the controller core card 410, a control processor 510 accesses data from a control store 520 via an address bus 522 and a data bus 524. The control processor 510 also configures various devices and accesses configuration information. In one embodiment, the configuration signals are transmitted from the control processor 510 over the data transfer buses 526 and 528.

A host-side data bus 526 and a storage-side data bus 528 are high performance data buses that facilitate the transfer of blocks of data between a host and a storage array such as the storage array 210. In one embodiment, a CRC engine 530 executes the actual transfers within the controller core card 410 and provides or checks CRC data depending of the direction of the transfer.

A host port 540 and a storage port 550 provide access to a host and a storage array respectively via the controller interface card 420. A data cache 560 stores and caches data blocks and provides an intermediate transfer point for the CRC engine 530. The CRC engine 530 accesses the data cache 560 through a data cache bus 562.

Figure 6:
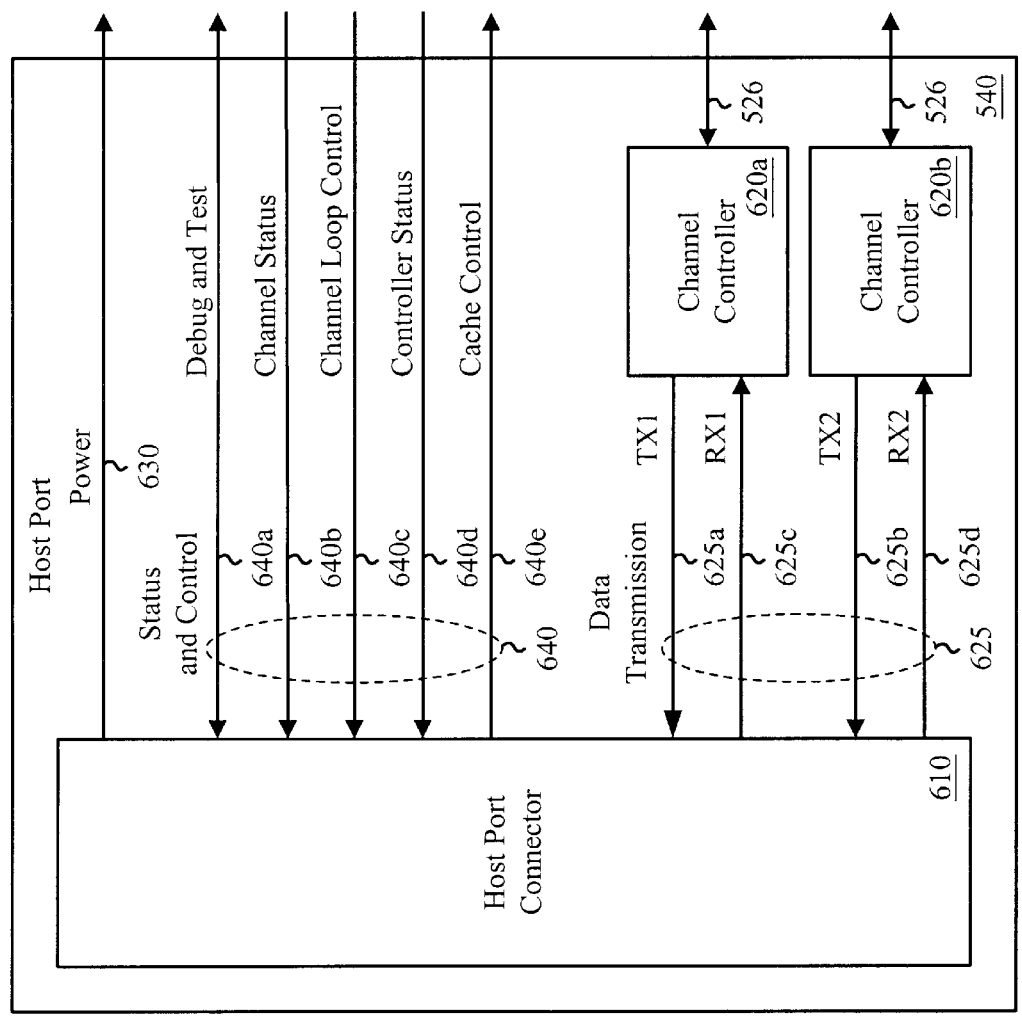
FIG. 6 is a schematic block diagram illustrating one embodiment of a host port of the present invention.

FIG. 6 is a schematic block diagram illustrating one embodiment of a configuration of the host port 540. Within the host port 520, a host port connector 610 carries a number of signals between the controller core card 410 and the controller interface card 420. A channel controller 620a, and a channel controller 620b support the transfer of blocks of data between the host-side data bus 526 and a host-side transmission bus 625. The host-side transmission bus 625 includes host transmit signals 625a and 625b, and host receive signals 625c and 625d. The signals on the host-side transmission bus 625 are carried on the host port connector 610.

The host port connector 610 also preferably carries signals associated with a power bus 630, and a status and control bus 640. The status and control bus 640 includes debug and test signals 640a, channel status signals 640b, channel loop control signals 640c, controller status signals 640d, and cache control signals 640e. In one embodiment, the particular signals carried by the host port connector 610 include those shown in Table 1.

TABLE 1

Host Port Status and Control Signals

| Group | Signal Name | Description |
|---|---|---|
| Debug And Test | MFG_DIAG | Boot in Diagnostic Mode |
| | PONRST | Reset Signal |
| | FORCE_DEBUG | Activate Test Port |
| | UART_TXD | Test Port Transmit Signal |
| | UART_RXD | Test Port Receive Signal |
| Channel Status | H0_ACTIVE | Host Channel 0 Activity |
| | H1_ACTIVE | Host Channel 1 Activity |
| | DEV0_ACTIVE | Storage Channel 0 Activity |
| | DEV1_ACTIVE | Storage Channel 1 Activity |
| Channel Loop Control | H0_LPEN | Loop 0 Arbitration Control |
| | H1_LPEN | Loop 1 Arbitration Control |
| Controller Status | BBU_FAULT | Backup Power Low |
| | READY | Controller Successfully Booted |
| | PRTNRFAIL | Partner Controller Failed |
| | CDIRTY | Cache Has Unwritten Data |
| Cache Control | CONCACHE | Flush Cache And Change To Write-thru Mode |

The power bus 630 comprises various power signals that are appropriate to power low voltage devices as well as standard TTL voltages. In one embodiment shown in Table 1, the debug and test signals 640a include a test port transmit and test port receive signal. The depicted embodiment also includes signals that reset the controller, boot the controller in a diagnostic mode, and activate a test port.

In the embodiment of Table 1, the channel status signals 640*b* indicate activity on a pair of host channels and a pair of storage channels. The channel loop control signals 640*c* provide arbitration control for a pair of host channels, such as those carried on the host connection 250 and the host loop 260. The controller status signals 640*d* include signals that indicate when backup power is low, the controller has successfully booted, the partner controller has failed, and the data cache has unwritten data. The cache control signals 640*e* include a signal that facilitates flushing the data cache and changing to a write-through mode. Those skilled in the art will appreciate that changing to write-through mode decreases the probability of system failures in certain situations, for example when operating on backup power.

Figure 7:
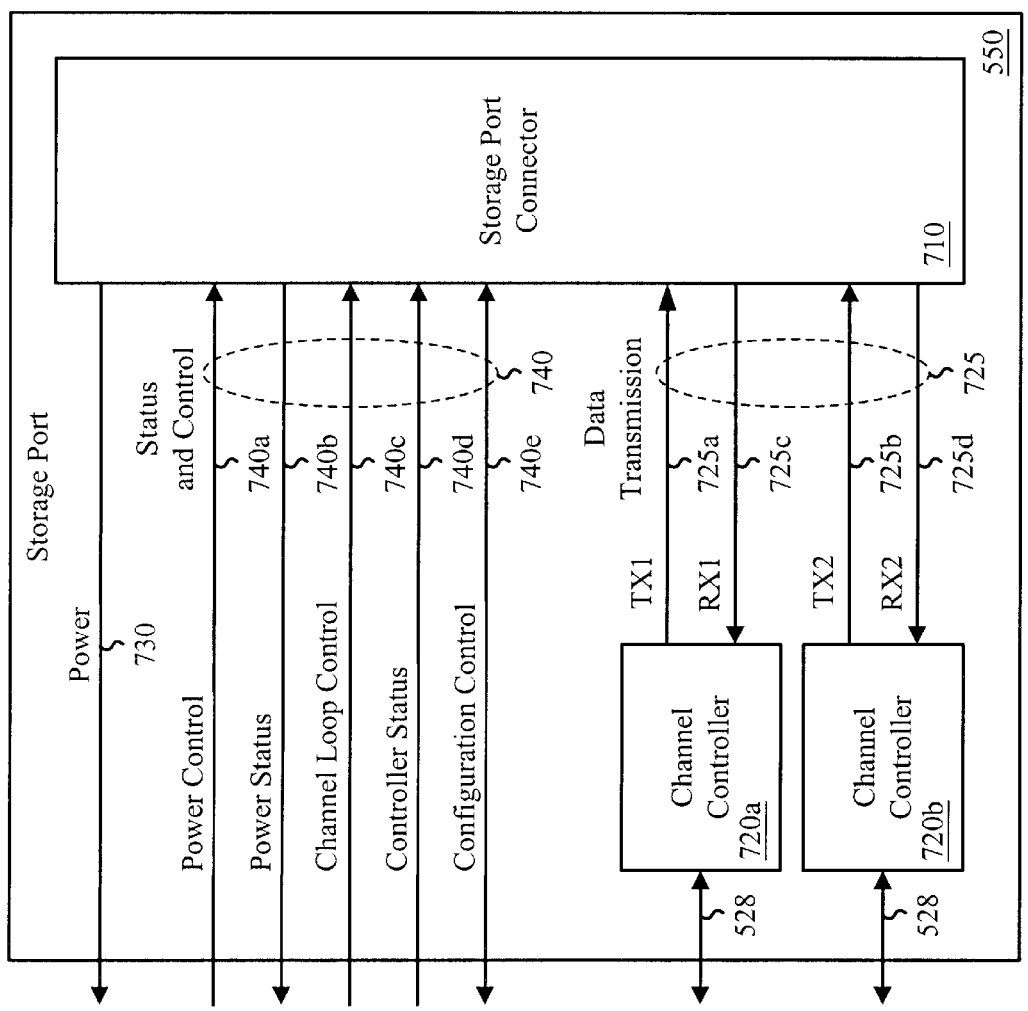
FIG. 7 is a schematic block diagram illustrating one embodiment of a storage port of the present invention.

FIG. 7 is a schematic block diagram illustrating one embodiment of the storage port 550. The storage port 550 is similar in form to the host port 540 and includes a storage port connector 710, a channel controller 720*a*, and a channel controller 720*b*. The channel controllers 720*a* and 720*b* manage transfers between the storage-side data bus 528 and a storage-side transmission bus 725.

The storage-side transmission bus 725 includes storage transmit signals 725*a* and 725*b*, as well as storage receive signals 725*c* and 725*d*. The signals of the storage-side transmission bus 725 are carried by the storage port connector 710. The storage port connector 710 also carries the signals associated with a power bus 730, and a status and control bus 740. The status and control bus 740 includes power control signals 740*a*, power status signals 740*b*, channel loop control signals 740*c*, controller status signals 740*d*, and configuration control signals 740*e*. In one embodiment, the particular signals carried by the storage port connector 710 include those shown in Table 2.

TABLE 2

Storage Port Status and Control Signals

| Group | Signal Name | Description |
|---|---|---|
| Power Control | IDLE | Turn on Backup Power |
|  | DISCHG | Begin Backup Power Reconditioning |
|  | CHARGE | Begin backup Power Recharge |
| Power Status | PDN | Switching to Backup Power |
|  | BPON | Backup Power ON |
|  | BP_OFF | Backup Power OFF |
|  | DLBPON | Delayed Version of BPON |
| Controller Status | CCACHE | Cache is active |
|  | CARD_ID | Card is Master |
| Channel Loop Control | DEV1_LPEN | Loop 1 Arbitration Control |
|  | DEV0_LPEN | Loop 0 Arbitration Control |
| Configuration Control | SCL, SCA | Serial Data Bus |

The storage port 550 is associated with storage arrays such as the storage array 210. Power control is essential to maintaining data integrity within storage arrays in the event of power disruptions or outages. In the preferred embodiment, the storage port 550 and the storage port connector 710 support a variety of signals that facilitate intelligent power management. For example, the power bus 730 may include various power signals appropriate to operating in a standby mode such as when backup power sources are nearly depleted. In one embodiment, a standby mode maintains data integrity by causing all the devices on the controller core card 410 to shutdown except for the data cache 560.

The embodiment documented in Table 2 includes a variety of signals for intelligent power management. For example the power control signals 740*a* include signals that activate backup power, begin backup power reconditioning, and begin backup power recharging. The power status signals 740*b* includes signals that indicate when backup power is being activated, backup power is now on, backup power is off, and backup power was recently activated.

The embodiment documented in Table 2 also includes the channel loop control signals 740*c*, the controller status signals 740*d*, and the configuration control signals 740*e*. The channel loop control signals 640*c* provide arbitration control for a pair of storage channels, such as those carried on the array loop 240. The controller status signals 740*d* are status signals that are relevant to a storage array such as a signal for indicating that the data cache is active, and a signal to indicate if the controller is a master controller. The configuration control signals 740*e* enable the control processor 510 to read configuration information from the controller interface card 420. In the depicted embodiment, the configuration information determines the operating parameters of the RAID system 300 such as the type of data redundancy used when storing data on the storage array 210.

Figure 8:
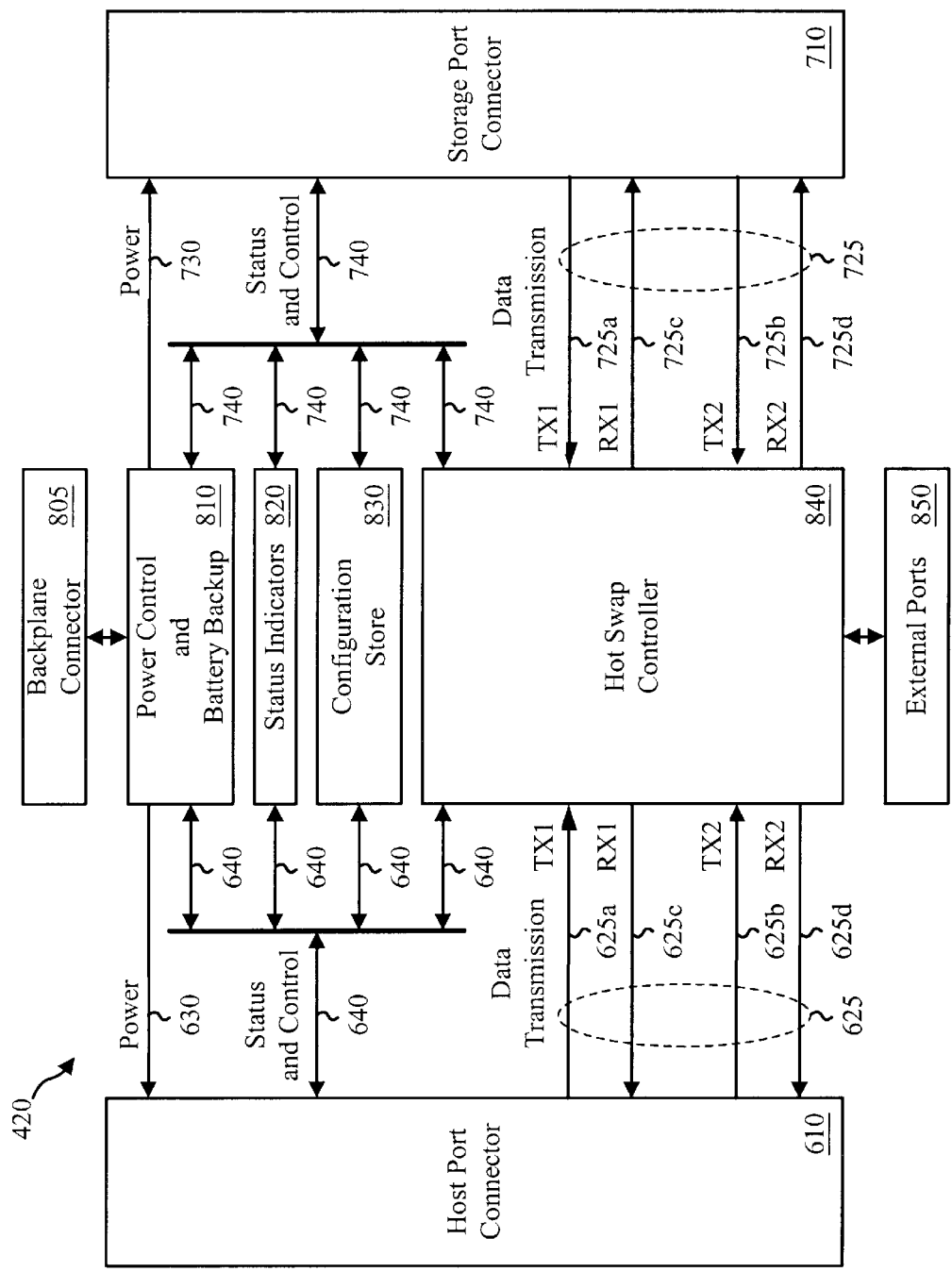
FIG. 8 is a schematic block diagram illustrating one embodiment of a controller interface card of the present invention.

FIG. 8 is a schematic block diagram illustrating one embodiment of the controller interface card 420. In the depicted embodiment, the controller interface card 420 complements and mates with the controller core card 410 via the host port connector 610 and the storage port connector 710. The embodiment depicted in FIG. 8 also includes a backplane connector 805, a power control unit 810, one or more status indicators 820, a configuration store 830, a hot swap controller 840, one or more external ports 850, a power bus 630, a power bus 730, a control and status bus 640, a control and status bus 740, a host-side transmission bus 625, and a storage-side transmission bus 725.

The backplane connector 805 provides electrical and physical connectivity to other elements of a particular RAID system or application including, for example, alarm devices, system power and system ground. The power control unit 810 receives system power as well as backup power and provides the power signals required by the power bus 630 and the power bus 730. The power control unit 810 also receives and provides appropriate signals from the status and control bus 640 as well as the status and control bus 740. Examples of these signals include the power control signals 740*a*, the power status signals 740*b* and the controller status signals 640*b*.

The various signals received and provided by the control unit 810 facilitate intelligent power management by the power control unit 810 and the RAID controller card set 400. For example the RAID controller card set 400 may operate in a standby mode when system power is unavailable. The standby mode may allow certain critical operations while logging or deferring others. In one embodiment, the standby mode provides power to the data cache 560 while all other components are shut down.

The external ports 850 provide external access for the host-side transmission bus 625 and the storage-side transmission bus 725. For example, in one embodiment the external ports 850 connect to the array loop 240 and the host loop 260. In one embodiment the external ports 850 are routed through the backplane connector 805.

In the depicted embodiment, the hot swap controller 840 detects whether the controller core card 410 is attached to the controller interface card 420 and fully operational. If not, the hot swap controller 840 bypasses the controller interface card 420 by bridging the signals from two pairs of external ports to one another in place of the host-side transmission bus 625 and the storage-side transmission bus 725. In one embodiment the hot-swap controller 840 and the power control unit 810 work together to detect insertion or removal of the controller interface card set 400 into a system backplane and properly stage the power signals to prevent malfunctioning or failures within the RAID controller card set 400.

The controller interface card 420 is designed to customize and adapt the RAID controller card set 400 to a particular RAID application or system. Therefore, the precise embodiment of the controller interface card 420 is subject to the requirements of the particular RAID product or system. Some of the elements may be eliminated or minimized according to the desired constraints. For example, some embodiments may include custom components such as a backup battery carried on the controller interface card 420, while others do not. In practice, the depicted embodiment may be a reference design from which a plurality of controller interface cards 420 are designed and optimized for a particular RAID product or system. Providing a reference design lowers the cost, and hastens the production and deployment of the RAID controller card set 400 and the corresponding modular RAID controller 310.

Figure 9:
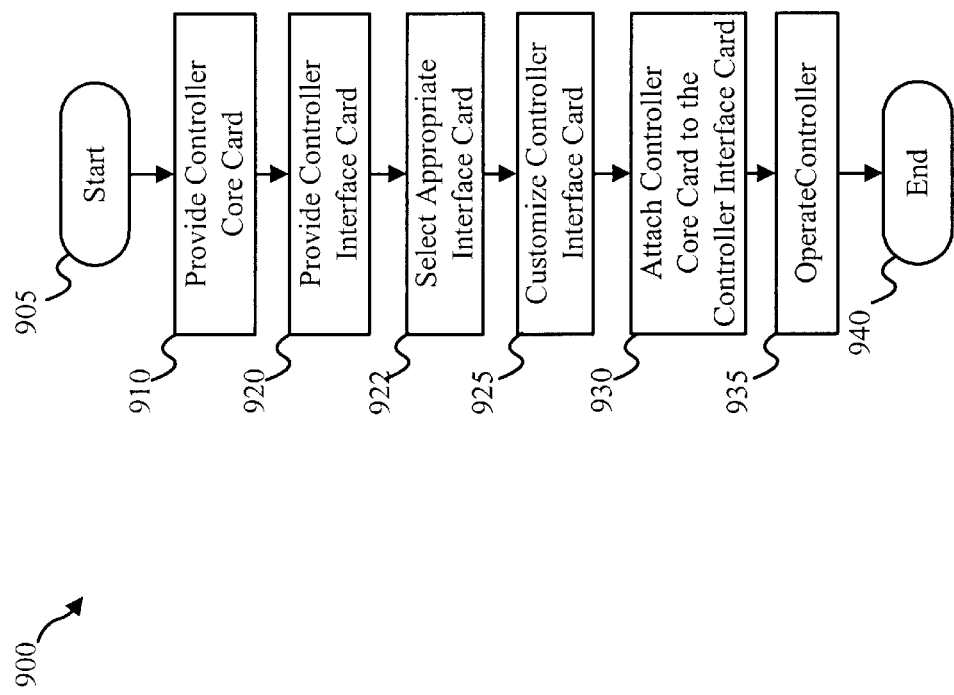
FIG. 9 is a schematic flowchart diagram illustrating one embodiment of a RAID controller customization method of the present invention.

FIG. 9 is a schematic flowchart diagram illustrating one embodiment of a RAID controller customization method 900 of the present invention. The method 900 of FIG. 9 will be discussed by way of example with reference to the system of FIGS. 1 through 8, but it should readily apparent that the method of FIG. 9 may be conducted independent of the embodiments discussed herein for FIGS. 1 through 8. The customization method 900 starts 905, after which a controller core card such as the controller core card 330 of FIG. 3 is provided 910. A controller interface card such the controller interface card 340 of FIG. 3 is then also provided 920. In practice, a number of controller interface cards may be available for deployment each with particular features. When a selection of controller interface cards are available, the method 900 also includes selecting 922 the controller interface card appropriate for a particular product or application.

In one embodiment, the controller interface card 940 is then customized 925. This may comprise adding components particular to the application, such as a backup battery or extra memory, or the like. Any other customization steps may likewise be conducted.

Under the customization method 900 the controller core card 330 is then attached 930 to the controller interface card 340. In one embodiment, the controller core card 330 is a daughter card, and attaching the controller core card 930 comprises fastening the controller core card 930 in place using fasteners associated with the host port connector 610 and the storage port connector 710. The custom configured controller card set 310 is then ready for operation 935, after which the method 900 terminates 940.

The present invention may be embodied in other specific forms without departing from its spirit or essential characteristics. The described embodiments are to be considered in all respects only as illustrative and not restrictive. The scope of the invention is, therefore, indicated by the appended claims rather than by the subsequent description. All changes, which come within the meaning and range of equivalency of the claims, are to be embraced within their scope.

What is claimed is:

1. A RAID controller for controlling RAID storage arrays, the RAID controller comprising:

a RAID controller interface card comprising power control, configuration settings, connectors to communicate with disk drives and connectors to communicate with a host computer; and a RAID controller core card comprising a RAID control processor, a storage cache, and channel controllers; and wherein said RAID controller core card is mounted on said RAID controller interface card for electrical and mechanical connection with said RAID controller interface card, and said RAID control processor communicates with said disk drives and said host computer via said RAID controller interface card.

2. The RAID controller of claim 1, wherein the RAID controller core card further comprises a storage port configured to communicate with said disk drives through said RAID controller interface card.

3. The RAID controller of claim 2, wherein said RAID controller core card communicates with said host computer and said disk drives only via said RAID controller interface card.

4. The RAID controller of claim 1, wherein the connectors to attach to said host computer are configured to carry signals relating to host communications and the connectors to attach to said disk drives are configured to carry signals relating to storage communications.

5. The RAID controller claim 1, wherein said RAID controller core card further comprises a test port for conducting diagnostics.

6. The RAID controller of claim 1, wherein the RAID controller core card further comprises a CRC engine configured to provide data redundancy.

7. The RAID controller of claim 1, wherein said RAID controller core card further comprises sockets into which memory for the storage cache is removably insertable.

8. The RAID controller of claim 1, wherein the RAID controller interface card comprises a cutout configured to provide access to memory for the storage cache.

9. The RAID controller of claim 1 wherein said RAID controller interface card further comprises battery backup.

10. The RAID controller of claim 1 wherein said RAID controller interface card further comprises status indicators.

11. The RAID controller of claim 1 wherein said RAID controller interface card further comprises hot swap features.

12. The RAID controller of claim 1 wherein said RAID controller core card further comprises an XOR function.

13. The RAID controller of claim 9 wherein said RAID controller core card further comprises an XOR function.

14. A RAID controller for controlling RAID storage arrays, the RAID controller comprising:

a RAID controller interface card comprising power control, configuration settings, connectors to communicate with disk drives and connectors to communicate with a host computer; and a RAID controller core card comprising a RAID control processor, an XOR function and a storage cache; and wherein said RAID controller core card is mounted on said RAID controller interface card for electrical and mechanical connection with said RAID controller interface card, and said RAID control processor communicates with said disk drives and said host computer via said RAID controller interface card.

15. A RAID controller as set forth in claim 14 wherein said RAID controller core card further comprises channel controllers.

16. The RAID controller of claim 14 wherein said RAID controller interface card further comprises battery backup.

17. The RAID controller of claim 14 wherein said RAID controller interface card further comprises status indicators.

18. The RAID controller of claim 14 wherein said RAID controller interface card further comprises hot swap features.

* * * * *